United States Patent [19]

Chikhani et al.

[11] Patent Number: 4,839,657
[45] Date of Patent: Jun. 13, 1989

[54] SYSTEM FOR RECORDING AND REPRODUCING RADAR SIGNAL INFORMATION

[75] Inventors: Rene J. Chikhani, Fremont, Calif.; Frank Weber, Rome, Italy

[73] Assignee: Ampex Corporation, Redwood City, Calif.

[21] Appl. No.: 65,244

[22] Filed: Jun. 19, 1987

[51] Int. Cl.⁴ .............................................. G01S 13/89
[52] U.S. Cl. .................................................. 342/190
[58] Field of Search ................ 342/190, 90, 175, 179, 342/195, 197

[56] References Cited

U.S. PATENT DOCUMENTS

| | | | |
|---|---|---|---|
| 3,153,231 | 10/1964 | Caspers et al. | 342/90 |
| 3,253,277 | 5/1966 | Preston et al. | 342/74 |
| 3,325,806 | 6/1967 | Wilmot et al. | 342/94 |
| 3,731,304 | 5/1973 | Caspers et al. | 342/90 |
| 3,797,014 | 3/1974 | Tompkins et al. | 342/90 |
| 3,803,603 | 4/1974 | Perot | 342/90 |
| 3,919,707 | 11/1975 | Evans | 342/90 |
| 3,976,999 | 8/1976 | Moore et al. | 342/90 |
| 3,978,480 | 8/1976 | Tsuruta et al. | 342/90 |
| 3,981,008 | 9/1976 | Mann | 342/41 |
| 4,005,416 | 1/1977 | Tucker et al. | 342/90 |
| 4,062,012 | 12/1977 | Colbert et al. | 342/90 |
| 4,068,231 | 1/1978 | Wilmot | 342/90 |
| 4,070,673 | 1/1978 | Schmidt et al. | 342/90 |

OTHER PUBLICATIONS

Ampex Corporation, "HBR-3000; High Bit Rate Recording System," Sep., 1982 (D435), all pages.

*Primary Examiner*—Thomas H. Tarcza
*Assistant Examiner*—John B. Sotomayor
*Attorney, Agent, or Firm*—Elizabeth E. Strnad; Richard P. Lange

[57] ABSTRACT

A recording and reproducing system for radar signal information includes a pulse stretcher that detects master trigger pulses and, upon each occurrence, provides a stretched pulse having extended duration consistent with a selected recording bandwidth; a detector to detect the stretched pulses and to provide a binary information signals; an echo pulse processor to sample and quantize radar echo pulses to at least one bit level. The quantized echo pulses are recorded on multiple channels and the binary information signals are recorded on a single channel of selected bandwidth.

17 Claims, 3 Drawing Sheets

SYSTEM FOR RECORDING AND REPRODUCING RADAR SIGNAL INFORMATION

BACKGROUND OF THE INVENTION

1. Field of the Invention

The present invention generally relates to the recording of radar (radio detection and ranging) signal information and, more particularly, to recording of such signal information by recorder machines employing magnetic recording media.

2. State of the Art

In many situations, it is desirable to have records of information that is transmitted and received by radar systems. For example, in aircraft traffic-control systems using radar, accurate records of radar transmissions and receptions can be employed to improve the effectiveness of the systems and can be used to determine causes of mishaps. Also, it is sometimes desirable to have unmanned radar installations; for such installations, records of radar transmissions and receptions are mandatory.

Accurate recording of radar information, however, is complex. In part, such complexities arise because radar information is inherently temporal, which is to say that any recording of radar information should be reproducible in a manner that preserves original timing relationships. Thus, for example, knowledge from a record that radar detected two objects at given locations is of limited value unless a precise relationship can be established between the time of detection of the first object and the time of detection of the second object. Additional complexities arise when radar antennae are in motion, either linearly or rotationally.

In radar systems, it is typical to display radar echo signals in real time on the phosphorescent screens of pulse position indicator (PPI) machines. Synchronization for purposes of display of echo signals on PPI screens is accomplished through use of signals known as master trigger signals. Generally speaking, master trigger signals are pulses having fast-rising leading edges that are used to control PPI machines and which serve as benchmarks for detecting the periods between echo pulse transmissions and receptions. That is, master trigger signals serve as benchmarks for determining the locations of detected objects relative to transmitting radar systems. Master trigger pulses normally are of very short duration, usually about four to twelve microseconds. The number of master trigger pulses transmitted per second defines the radar pulse repetition frequency. (The time from the beginning of one master trigger pulse to the beginning of the next master trigger pulse is the pulse repetition time and is the reciprocal of the pulse repetition frequency.) Pulse repetition time is variable depending upon the selected range of the radar system, and is generally a few hundred microseconds or less.

Machines of various types have been used to record radar transmission and reception information of the type that is normally displayed on PPI machines. However, such recordings of PPI-type radar information has been problematical. One difficulty relates to resolution, i.e., the ability to record and reproduce sharp changes in reflected radar signals. If resolution is diminished upon recording or reproduction of radar information, it may be difficult or impossible during replay to discern whether a radar reflection represents a single object or multiple objects that are close together, especially if the objects are slow-moving. To provide high resolution, the leading edges of radar information signals must be clearly reproduced. Because the leading edges of such signals have very fast rise times, recording of the signals requires wide bandwidths approaching ten megahertz; by way of comparison, ordinary television signals have a bandwidth less than about six megahertz, and conventional videotape recording (VTR) machines normally record over a bandwidth of about four or five megahertz.

To obtain recordings over bandwidths appropriate for PPI-type radar information, one conventional approach has been to use VTR machines of the helical scan type that have rotary record and reproduce heads to record information in analog form at an angle to the tape transport direction. For present purposes, such machines will be called analog rotary-type VTR machines. The advantage of analog rotary-type VTR machines is that wideband radar signals can be recorded for periods of up to an hour or so on a single reel of magnetic recording tape. As configured for recording PPI-type radar signal information, such machines often have two recording channels, one of which is used for echo signal information and the other of which is used for multiplexed master trigger signal information and azimuth information. In such a configuration, the machines are often referred to as dual channel recorders.

Recording of PPI-type radar signal information on analog rotary-type VTR machines, however, has been fund to have several shortcomings. One shortcoming is that recording noise can cause substantial signal loss; that is, the signal to noise (S/N) ratio may be so low over portions of the bandwidth that, upon reproduction, noise sometimes cannot be distinguished from intelligent signal information.

Another shortcoming of conventional radar recording systems using analog rotary-type VTR machines relates to replay of the information. Recording and replay of signal information by VTR machines of the rotary type inevitably introduces time related errors, usually referred to as time-displacement errors. The time-displacement errors can arise from various mechanical and electrical sources, including tape-motion irregularities, head-motion irregularities, and tape-dimension changes. These factors cause variations in recording and playback speeds which, if not compensated for upon replay, can cause image instabilities. The instabilities are often manifested as picture jitter or skew. In dual channel recorders, inter-channel skew can occur during replay and may prevent the output of one channel from being precisely correlated to the output of the other channel.

In the case of television signal information processed by analog rotary-type VTR machines, time-displacement errors are often compensated for upon replay by time-base corrector (TBC) devices. Modern TBC devices include analog-to-digital converters to digitize the video portion of television signal information, memory elements to store the digitized signals, and digital-to-analog converters to provide analog video output signals. With such TBC devices, the digitized video signal information can be recovered from memory at controlled rates in synchronization with stable, standardized fixed-frequency television timing signals that are normally generated independent of the recorded signals. Such systems can overcome most time-displacement errors by employing the standard fixed-frequency signals.

In contrast, standard fixed-frequency synchronizing signals are usually not available for use in recording signal information provided by radar systems. The radar master trigger signals, which provide synchronization during real-time operation of radar systems, normally do not occur at standard repetition rates. Hence, upon replay of recorded radar signal information from analog rotary-type VTR machines, time displacement errors normally cannot be overcome by conventional TBC devices. Also, in radar systems employing rotating antennae, the rate of antenna rotation may not be constant and such variations may further complicate correction of time-displacement errors. The net result of such complications in conventional analog recording of radar signal information is that recorded target images often will exhibit substantial jitter when replayed for display on a PPI screen.

The preceding discussion has focussed upon analog recordings of radar signal information. The distinguishing feature of analog recordings is that analog input signals are recorded in a time-varying (i.e., analog) manner, usually through modulation techniques. It is well known in the prior art, however, that analog signals can be encoded into digital signals by using binary digits. In the case of television signal information, such digital encoding of analog signals can be accomplished, for example, by the digital TBC devices discussed above. Digital encoding is also widely used with communication signals and with instrumentation and sensor signals. Normally, digital encoding is accompanied by analog-to-digital converter (ADC) devices that take samples of the analog signals at predetermined intervals and, for each sample, quantize the amplitude of the analog signal in terms of a binary code. To obtain accurate representations of analog signals, the sampling rate must be rapid enough to capture critical changes in signal levels. (For a relatively smoothly changing analog signal, the minimum sampling rate normally is several multiples of the signal frequency; thus a one megahertz analog signal, for instance, will ordinarily be sampled at a rate that provides at least two or three million samples each second.) An adequate sampling frequency for replicating radar signal information is normally in excess of about six megahertz. Further to obtain accurate digitally-encoded representations of analog signals, a sufficient number of quantizing levels must be provided to reflect the various amplitudes of the analog signals. The quantizing levels are normally expressed in binary code according to well-known procedures. Although signal replication accuracy is improved by using high bit codes (i.e., numerous quantizing levels), such accuracy is achieved at the expense of transmission time or bandwidth, or both.

To record digitally-encoded signal information on magnetic tape, it is well known to employ devices similar to videotape recorders. Often such devices are referred to as high digital data rate (HDDR) recorders or high-bit-rate (HBR) recorder/reproducers. One example of such recorder/reproducers is the model HBR 3000i recorder manufactured by Ampex Corporation of Redwood City, Calif. A significant advantage of such recorder/reproducer machines is substantial reduction of signal noise problems due to the digital signal processing.

Recording and reproduction of digitally-encoded signal information by machines is normally accomplished by a plurality of fixed (i.e., nonrotary) transducer heads. Typically, HDDR and HBR recorder/reproducers employ recording techniques whereby streams of binary information from several sources, or parallel streams derived from a single source, are recorded simultaneously over a plurality of separate channels. In terms of magnetic recording tape, the channels are recorded on parallel tracks that extend lengthwise (i.e., longitudinally) on the tape. The Ampex HBR 3000i recorder can be configured, for example, to record on either fourteen or twenty-eight parallel longitudinal channels and, in the latter configuration, can record digital information at rates up to about one hundred and fifty megabits per second at tape speeds of about 180 inches per second (ips).

Using the longitudinal tape transport technology of HDDR and HBR recorder/reproducers, it is known to record highly precise synchronizing information simultaneously with the other data being recorded. By employing the synchronizing data during replay, such machines can be operated to substantially minimize time-displacement errors. In the case of Ampex HBR recorder systems, for example, unique synchronization (sync) words are sequentially inserted in parallel data streams that are input to the recorder system; when binary information in a data stream is replaced by a sync word, the replaced information is recorded on a master channel, thus preserving the information. In practice, the process of data removal and replacement is repeated at selected bit intervals such as every 512 bits. During replay of a recording, electronic deskew logic detects the unique sync words in each track, removes corresponding binary information from the master channel and stores the decoded information in registers for simultaneous clocking out by an internal (or external) clock to replicate the original data format. The final result is substantial reduction of time-displacement errors and is a major advantage of such machines.

Conventional HDDR and HBR recorder/reproducers that employ longitudinal (i.e., fixed head) recording techniques have, however, some limitations when recording PPI-type radar signal information. A primary limitation relates to the bandwidth of the information. At normal tape transport speeds, the bandwidth recording and/or reproduction capability of each channel of conventional fixed-head recorder/reproducers are limited to about two or three megahertz because of the characteristics of the fixed transducer heads. To record broader bandwidths, such as required for radar signal information, the conventional approach with such recorder/reproducer machines is to increase tape transport speed. This approach, however, reduces the recording time obtainable from a tape reel and, therefore, may necessitate frequent changing of reels, perhaps as often as several times each hour when radar signal information is recorded.

Bandwidth limitations of fixed transducer heads also limit the input data rates than can be accommodated by HDDR and HBR recorder/reproducers. (The recording and/or reproduction performance of such machines is normally limited to about five to six megabits per second per track at normal tape transport speeds.) To overcome bandwidth limitations of such machines in some instances, it is known that specialized serial-to-parallel digital data converters can be employed. When their use if feasible, such converters accept high data rates (sometimes in excess of 100 megabits per second) and distribute the incoming data streams into a number of lower rate data channels for simultaneous recording in parallel. Such serial-to-parallel converters represent an expense, however, and are not feasible in all circumstances.

At this juncture, it should be emphasized that digital encoding of radar signal information with conventional technology ordinarily requires a sampling rate in excess of about ten megahertz to provide good resolution of the data and to normally require quantization 6 to 8 bits to provide adequate signal-to-noise ratios. The high sampling rates are required with current technology because master trigger signals must be precisely detected and recorded. Thus, if information obtained from broadband sampling of radar signal information is completely recorded, current technology requires HDDR and HBR recorder/reproducers to operate at extraordinarily high tape speeds and to employ several recording channels for recording the master trigger signal information. Occupancy of multiple channels by encoded master trigger information, in turn, limits the number of channels available for other components of the radar signal information, such as echo pulse information and azimuth data. The problem of channel occupancy is compounded if the recorded radar signals include pre-trigger pulses. (Such pulses resemble master trigger pulses but precede them by several milliseconds; generally speaking, pre-trigger pulses are used to control PPI machines by defining the ends of PPI sweeps.) Thus, when conventional HDDR or HBR machines are used to record both master trigger and pre-trigger radar pulses as well as radar echo pulse information using longitudinal recording techniques, recording cycles per machine are substantially reduced, usually to a recording time per reel of only about fifteen minutes or less. Accordingly, notwithstanding the capacity of such recorder/reproducers to record large amounts of binary data in short periods of time, workers in the art have believed such machines were generally not practical or cost-effective for providing extended recordings of complete radar signal information.

Because of the current limitations of HDDR and HBR recorder/reproducers using longitudinal recording techniques to record radar data, signal processing techniques have been developed to selectively sample only certain portions of radar information and then to provide for recording only the sampled information that meets certain predetermined criteria. For example, a sampling system of the type under discussion may operate to sample raw radar data only one per several occurrences of master trigger signals. Such sampling techniques effectively extend recording time per reel because only a fraction of the available information is recorded; however, such sampling techniques are also complex and usually expensive because of required electronic decision-making circuitry. Also, there are situations where sample information is not sufficient because recordings and reproductions of it lack all the intelligence needed for certain purposes.

OBJECTS AND SUMMARY OF THE INVENTION

Generally speaking, an object of the present invention is to provide an improved system for recording complete radar information for extended periods.

More particularly, an object of the present invention is to provide a signal processing system that enables recorder/reproducer machines to record complete and continuous radar signal information with minimal time-displacement irregularities for extended periods without requiring frequent replacement of the recording medium.

In accordance with the preceding objects, the present invention provides a system to accurately record and playback radar signal information comprising a device connected to detect occurrence of master trigger pulses and, upon each occurrence, to provide a stretched pulse having a leading edge coinciding in time with the leading edge of the detected master trigger pulse and having relatively extended duration; a detector to detect the presence of each of the stretched pulses and to provide an information signal representative of occurrence of the leading edge of each master trigger pulse; an echo pulse processor to convert a serial stream of sampled echo pulses to parallel streams; and a recorder/reproducer connected to record the information signals and the parallel streams of echo pulses on magnetic recording media.

The present invention further provides a process to accurately record and playback radar signal information. The process comprises the steps of: detecting each occurrence of master trigger pulses and, upon each detection, providing a stretched pulse having a leading edge generally coinciding in time with the leading edge of the detected master trigger pulse and having relatively extended duration; detecting the presence of each stretched pulse and, upon each detection, providing an information signal; converting a serial stream of sampled echo signals to parallel streams; recording the parallel streams of echo signals and the information signals on magnetic recording media.

Additional objects and advantages of the present invention can be ascertained by reference to the following description and attached drawings which illustrate the preferred embodiment.

DETAILED DESCRIPTION OF THE PREFERRED EMBODIMENT

Figures 1, 2, 3:
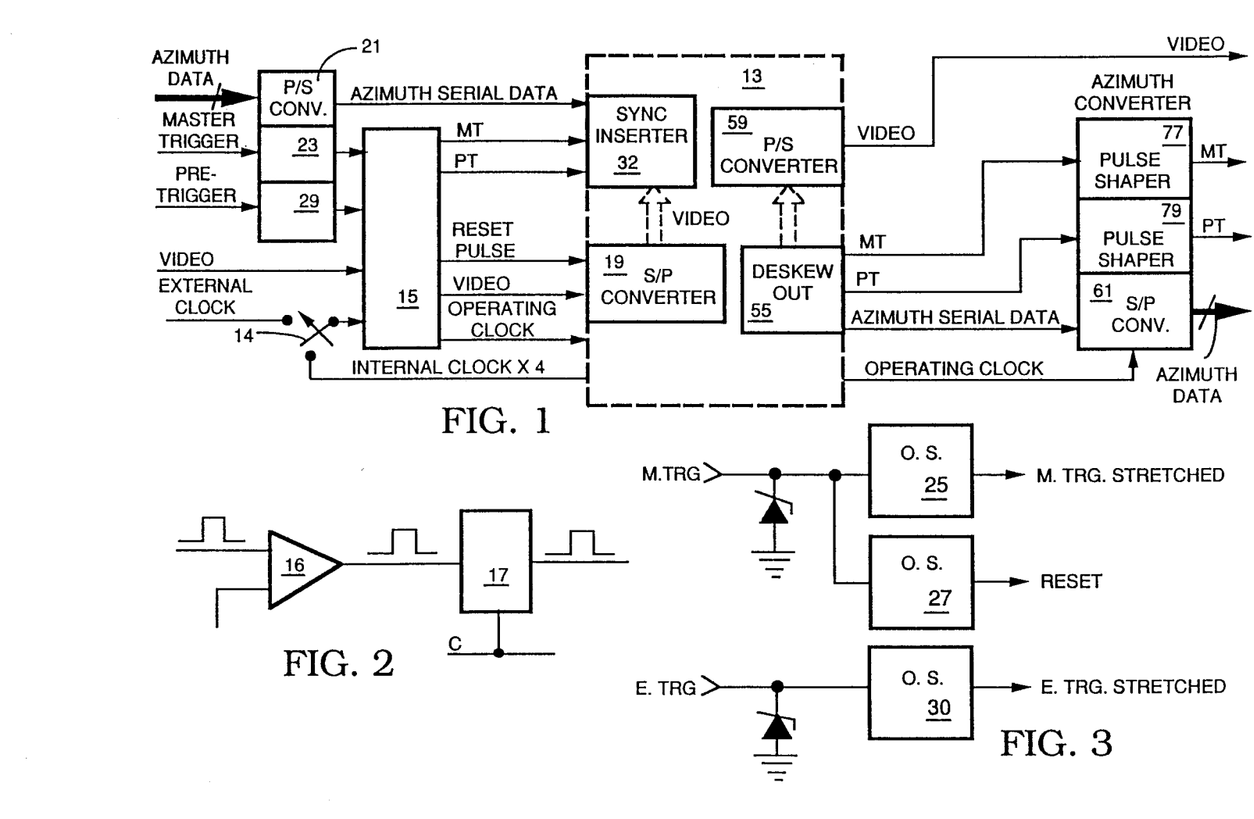
FIG. 1 is a functional diagram of a system according to the present invention for recording and reproducing radar signal information.
FIG. 2 is a functional block diagram of a subsystem for use in the system of FIG. 1 to obtain samples of radar echo signals.
FIG. 3 is a functional block diagram of a subsystem for use in the system of FIG. 1 to stretch pre-trigger signals.

Generally speaking, FIG. 1 shows a system wherein a recorder/reproducer 13 is connected to receive and record PPI-type radar signal information including azimuth, master trigger, pre-trigger and echo pulse information. Although the azimuth, master trigger, pre-trigger and echo information are shown as separate input streams in FIG. 1, it should be understood that all of the streams originate from real-time operation of a radar system and that preservation of temporal relationships between the information is of utmost importance. Preferably, the recorder/-reproducer 13 is a high digital data rate recorder/-reproducer as described in the preceding. (Again, a typical example of such a recorder/reproducer is the Ampex HBR 3000i machine.) Thus, it should be understood that recorder/reproducer 13 normally has the capability to simultaneously record multiple channels of digital information on a magnetic recording tape. When the system of FIG. 1 is operated in the playback mode, its output is reproduced radar signal information that can be displayed on a PPI screen or processed further.

Speaking more specifically of the system in FIG. 1, radar echo signals in analog form are conveyed to a detector 15 which encodes the analog signals for further processing. One embodiment of such a detector is shown in FIG. 2. In this embodiment, detector 15 generally comprises a threshold detector 16 connected to receive analog radar signals and to provide output signals to a one-bit sampling device 17. In practice, threshold detector 16 can comprise a conventional operational amplifier, as shown, or other circuitry which functions to provide output signals when, and only when, the amplitude of variable input signals exceeds a predetermined threshold level. Such threshold detectors are well known and are sometimes referred to as pulse formers because their outputs are generally sharply-defined rectangular pulses.

Further regarding FIG. 2, one-bit sampler 17 functions to sample the output of threshold detector 16 at predetermined intervals to provide a one-bit quantizing of the output. That is, the output of one-bit sampler 17 is either "high" or "low" depending upon the magnitude of the input at the sampling time. It should be appreciated that the level of quantizing is a matter of choice and that, although quantizing of radar echo signals to only the one-bit level has certain marked advantages, quantizing to multiple-bit levels can be practiced under appropriate circumstances. Devices that quantize analog signals to more than one level are usually referred to as analog-to-digital (A/D) converters. Thus, the one-bit sampler 17 can be characterized as a A/D converter having only one quantizing level.

As also shown in FIG. 1, the sampling rate for encoding the analog radar signals is determined by a clock (not shown) internal to recorder/reproducer 13. Such clock circuits are conventional; as are other components internally integral of recorder/reproducer 13. For processing radar signal information, the frequency of the internal clock is normally selected to be at least about several megahertz. In practice, a divider is provided to subdivide the clock, thereby, to provide a slower clock rates. The faster clock rate is used, for example, to define the sampling rate of one-bit sampler 17 of FIG. 2.

In practice, there may be situations where radar information conveyed to the system of FIG. 1 includes clocking signals. This could arise, for example, in radar systems that include digitizing circuitry &o provide output streams of digital signals carrying clocking pulses. In such circumstances, the system of FIG. 1 could be functionally clocked by the externally-generated clocking pulses. To provide for such circumstances, the system of FIG. 1 includes a switch 14 that permits usage of the external clock signals.

The encoded echo signals at the output of one-bit sampler 17 of FIG. 2 can be referred to as video signals because such signals provide echo signal information for display on a PPI screen similar to other video picture information. Following encoding by detector 15 of FIG. 1, the encoded information (i.e., the video information) is conveyed to a serial-to-parallel (S/P) converter 19.

As indicated in FIG. 1, S/P converter 19 is an integral component of recorder/reproducer 13 and, as such, is conventional. Preferably, S/P converter 19 is selectively programmable to convert the serial input stream of video information into a selected number of parallel streams. The parallel streams are subsequently recorded on separate individual channels by recorder/reproducer 13. In the case where recorder/reproducer 13 is a longitudinal-type (i.e., fixed head) recorder, the parallel streams are recorded on separate longitudinal channels of magnetic recording tape. It may be noted that conversion of the serial video data to parallel form requires a relatively substantial amount of time and, thus, introduces some signal processing delay into the system of FIG. 1. The amount of delay generally depends upon the characteristics of S/P converter 19 and the number of selected channels.

In practice, S/P converter 19 is comprised of a plurality of shift registers (not shown). Because arrival of a master trigger signal signifies that fresh echo pulse information will follow, it is important that the shift registers of S/P converter 19 be cleared of residual information from previously processed echo pulses before processing echo signal information associated with newly arriving master trigger pulses. If the shift registers were not cleared, then temporal relationships between output signals from S/P converter (i.e., relationships between data in the parallel output channels) would be distorted from the actual relationships. Clearing of the shift registers of S/P converter 19 in synchronization with arrival of master trigger signals can be accomplished by means that will be described in the following.

The system in FIG. 1 further includes a parallel-to-serial (P/S) converter 21 that receives azimuth data on a plurality of parallel lines and organizes that data in serial order for input to recorder/reproducer 13. Such parallel-to-serial conversion circuitry is well known for processing azimuth data.

Still further in the system in FIG. 1, a pulse stretcher device 23 is provided to receive master trigger signals. A preferred embodiment of pulse stretcher 23 is shown in FIG. 3. In this embodiment, the pulse stretcher is a one-shot (monostable) multivibrator 25 that provides a fast-rising output pulse coincident with the leading edge of each master trigger pulse. That is, one-shot multivibrator 25 is triggered by the leading edge of each master trigger pulse. The time constant of multivibrator 25 is chosen such that duration of each of its output pulses is substantially longer than the duration of the initiating master trigger pulse. Thus, the output pulses from the one-shot multivibrator 25 may be said to be "stretched", and the device 23 in FIG. 1 can be called a pulse stretcher. In practice, the time constant of multivibrator 25 is selected such that the durations of the stretched master trigger pulses are consistent with the bandwidths of the channels at which the stretched pulses are to be recorded. As shown in FIG. 1, stretched output pulses from pulse stretcher 23 are conveyed to detector 15.

Detector circuit 15 operates upon the stretched master trigger signals in the same way as upon the echo pulses, which is to say that the stretched master trigger pulses are periodically sampled at some multiple of the internal clock rate, and the output of the sampler provides quantizing of the sampled signals at the one-bit level. The sampling rate is selected to be consistent with the quantized signals to be recorded. At this juncture, it may be appreciated that stretching of the master trigger signals minimizes sampling errors and lowers the bandwidth necessary for recording. In addition to providing sampling and detection of master trigger waveforms, detector circuit 15 also selectively delays output of the encoded master trigger signals. That is, output signals from detector 15 are delayed in time relative to input signals but not altered in wave shape. Various circuit designs can be provided to accomplish this delay function.

Referring again to FIG. 3, there is shown a second one-shot multivibrator 27 connected to receive master trigger signals. One-shot multivibrator 27 operates in a manner similar to one-shot multivibrator 25 to generate fast-rising output pulses having leading edges coincident with the leading edges of the master trigger signals. In practice, the time constant of one-shot multivibrator 27 is usually selected such that its output pulses are of substantially shorter duration than the stretched pulses from one-shot multivibrator 25. The output pulses from one-shot multivibrator 27 are referred to as reset pulses in the following and are used for synchronizing purposes in the system of FIG. 1. In particular, as shown in FIG. 1, the reset pulses are transmitted to S/P converter 19. In the circuitry of S/P converter 19, the reset pulses function to clear the shift registers. Thus, immediately after a reset pulse arrives at S/P converter 19, the registers of the converter are cleared of information and, thus, are reset to receive echo pulse information that follows the reset pulse.

As mentioned above, radar information of the PPI-type may include pre-trigger signals. In the system of FIG. 1, the pre-trigger signals are processed (i.e., stretched) by a pulse stretcher 29 in essentially the same manner as the master trigger pulses. Accordingly, as illustrated in FIG. 3, a one-shot multivibrator 30 is provided to detect each pre-trigger pulse and to provide fast-rising output pulses whose leading edges are coincident with the leading edges of the detected pre-trigger pulses. In the preferred embodiment, the time constant of multivibrator 30 is selected such that the pre-trigger pulses are stretched for approximately the same duration as the master trigger pulses. As shown in FIG. 1, the stretched pre-trigger pulses are conveyed from pulse stretcher 29, to clock interface circuit 17 and then to recorder/reproducer 13.

The recorder/reproducer 13 of FIG. 1 further includes an integral synchronization inserter circuit 32 which receives azimuth serial data from P/S converter 21, video parallel data from S/P converter 19, and stretched master trigger pulses from clock interface circuit 18. If pre-trigger pulses are available, those too may be received from clock interface circuit 18. The synchronization inserter circuit 32 can function, for example, to insert unique sync words in the parallel data streams in the manner discussed above. Such synchronization insertion techniques are well known for minimizing time-displacement errors in the processing of data by recorder/reproducers. Following synchronization, the synchronized azimuth data and master trigger information is subsequently recorded on channels separate from the channels used for video information. The video information is recorded over a plurality of channels corresponding to the parallel conversions of the information.

The preceding completes the discussion of the structure of components on the record side of the system of FIG. 1. Operation of those components will now be further described in conjunction with FIG. 4.

Figure 4:
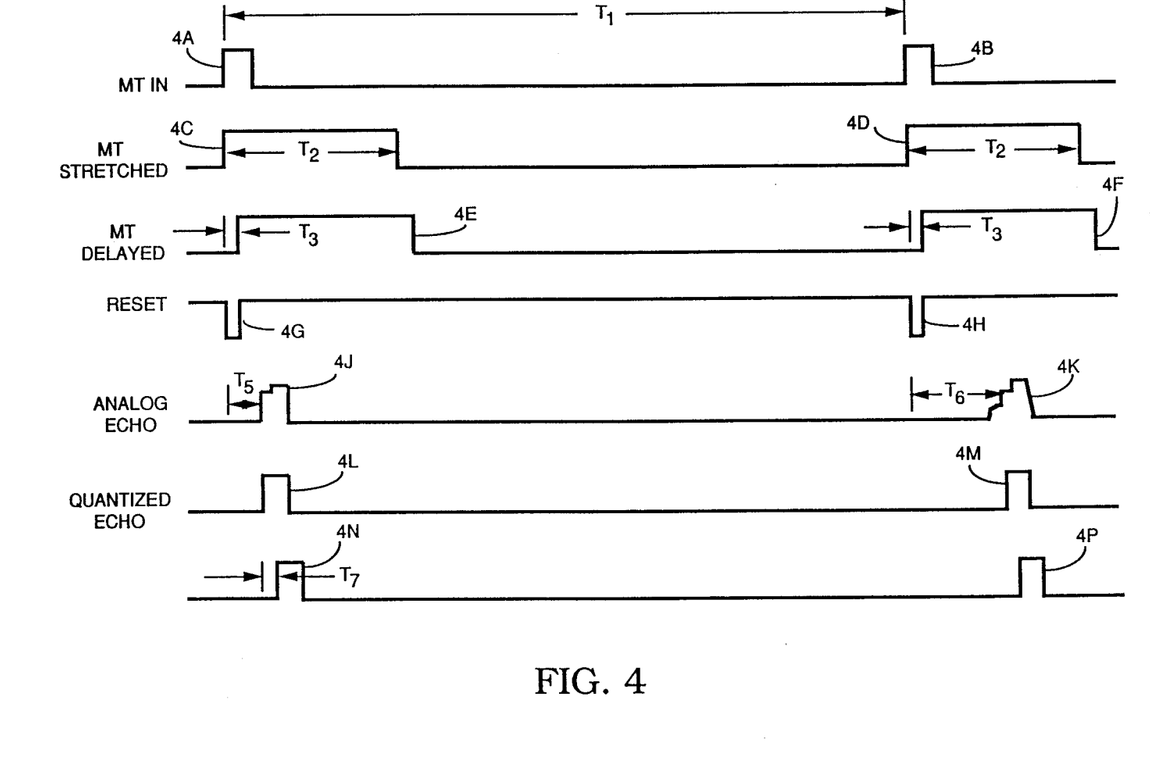
FIG. 4 is a timing diagram that shows waveforms at various locations within the recording portion of the system of FIG. 2.

Signal processing within the record portion of the system of FIG. 1 can be understood by referring to the waveforms in FIG. 4. In FIG. 4, waveforms 4A and 4B depict master trigger (MT) pulses which are generated by a typical PPI-type radar system. The time, $T_1$, separating pulses 4A and 4B represents the pulse repetition time. The reciprocal of $T_1$ is, of course, the pulse repetitions frequency and, normally ranges from about 400 to 1200 microseconds. It should be noted that time $T_1$ is defined between the leading edges of the MT pulses 4A and 4B. Typically, the duration of the MT pulses ranges from about four to about twelve microseconds but is not critical. Waveforms 4C and 4D are produced by pulse stretcher 23 concurrent with the leading edges of MT pulses 4A and 4B, respectively; that is, the leading edge of stretched pulse 4C coincides with the leading edge of MT pulse 4A and, likewise, the leading edge of stretched pulse 4D coincides with the leading edge of MT pulse 4B. Preferably, stretched pulses 4C and 4D have a duration $T_2$ exceeding one parallel clock cycle.

Waveforms 4E and 4F depict the pulses 4C and 4D, respectively, at the output of detector circuit 17. It should be noted that the leading edge of pulse 4E is delayed from the leading edge of pulse 4C by delay time $T_3$ and, likewise, the leading edge of pulse 4F follows the leading edge of pulse 4D by delay $T_3$. In practice, delay time $T_3$ is determined by the system clock and, preferably, is equal to several multiples the period of the system clock. Although the duration of delay period $T_3$ is arbitrary, the period is chosen to be sufficiently long to permit certain functions initiated by reset pulses to be completed as will be described further below. It may be noted that pulses 4E and 4F typically have substantially the same waveform as pulses 4C and 4D.

Waveforms 4G and 4H in FIG. 4 are reset pulses generated by one-shot multivibrator 27 of FIG. 3. In accordance with the previous discussion, the leading edges of the reset pulses 4G and 4H are coincident with the leading edges of master trigger pulses 4A and 4B, respectively. It may be recalled that the reset pulses are used to clear registers in S/P converter 19 between successive master trigger pulses. Because such resetting of the converter registers requires time, it is important that the flow of final information which is to occupy the registers begin some time after the reset pulses. The function of delay periods $T_6$ and other such delays is to provide such periods.

Referring still to FIG. 4, waveforms 4J and 4K represent analog echo pulses provided by a radar system. The shapes of these signals will vary substantially depending, for example, upon the characteristics of surfaces from which the pulses are reflected. Time periods $T_5$ and $T_6$ denote the times by which successive echo pulses 4J and 4K follow the leading edges of the master trigger pulses 4A and 4B, respectively. Time periods $T_5$ and $T_6$ are also variable and depend upon the distance the reflecting surfaces are separated from the radar transmitter. Further, if there is relative motion between a radar system and a target reflecting surface, the time period $T_5$ will ordinarily vary from time period $T_6$ if both pulses 4J and 4K are reflected from the same surface. In an actual radar system, a large number of echo pulses may be received in the interval between successive master trigger pulses and the durations of individual echo pulses may vary substantially as indicated, for example, by the differences in duration between echo pulses 4J and 4K.

Waveform 4L and 4M in FIG. 4 depict encoded video signals produced by one-bit sampler 17 of FIG. 2. It should be noted that, in duration, encoded signals 4L and 4M generally vary in accordance with the durations of echo pulses 4J and 4K, respectively. It should further be noted that an echo signal will not be encoded unless its amplitude exceeds a predetermined level determined by threshold detector 16 of FIG. 2. Thus, for example, the leading edge of video signal 4M does not coincide with the leading edge of echo pulse 4K but, instead, coincides with the leading of the "second step" of the echo pulse when the selected threshold level is exceeded.

Waveforms 4N and 4P are identical to signals 4L and 4M, respectively, but are each delayed by a predetermined time period, $T_7$, relative to signals 4L and 4M. Delay $T_7$ is imposed by detection circuit 15 of FIG. 1. The magnitude of delay period $T_7$ is a matter of choice depending upon the system characteristics.

The playback portion of recorder/reproducer 13 of FIG. 1 generally includes components to reassemble recorded streams of radar information so that output signals from the system have the same temporal relationship to one another as the input signals originally had. Thus, recorder/reproducer 13 includes an integral deskew circuit 55 which operates upon the encoded video signals, azimuth serial data, and the encoded master trigger and pre-trigger signals. The deskew circuit operates to restore the original temporal relationships among the recorded data and, especially, to minimize inter-channel skewing. Deskew circuit 55 is integral to recorder/reproducer 13 and is typical of conventional circuitry used in HDDR and HBR recorders to minimize time-displacement errors at the output of the recorders.

After processing by deskew circuit 55, encoded video signals are transmitted to a conventional parallel-to-serial (P/S) converter 59 integral to recorder/reproducer 13. The P/S converter 59 converts the video signals to a serial output stream suitable for use by a PPI-type machine. The serial video signals represent, of course, radar echo signals.

Azimuth serial data, after processing by deskew circuit 55, is transmitted to a conventional S/P converter 61. The function of S/P converter 61 is to convert the azimuth data in serial form to parallel form for use by a PPI-type machine in temporal synchronization with the serial video signals.

As further shown in FIG. 1, encoded master trigger pulses from deskew circuit 55 are conveyed to a pulse shaper circuit 77. In practice, pulse shaper 77 comprises a conventional one-shot multivibrator that provides fast-rising output pulses coincident with the leading edges of the encoded master trigger pulses. By adjusting the time constant of the multivibrator, the duration of each output pulse is selected to be generally the same as the duration of the initial master trigger pulses. Thus, the output pulses from one-shot multivibrator 61 can be said to be shortened with respect to the stretched master trigger pulses.

Another function of pulse shaper 77 is to selectively delay the shaped master trigger signals to achieve timing relationships with other signal streams (i.e., video and azimuth) that existed when signals were originally recorded by the system of FIG. 1. The primary reason such delays are necessary is to compensate for delays, such as serial-to-parallel conversion that were imposed to assist in processing the signal information.

The playback section of the system of FIG. 1 further includes a second pulse shaper circuit 79 connected to recorder/reproducer 13 to receive encoded pre-trigger signals. In practice, second pulse shaper 79 is a conventional one-shot multivibrator 33 that provides output pulses whose leading edges are coincident with the leading edges of the encoded pre-trigger pulse and whose durations replicate the original pre-trigger signals.

Figure 5:
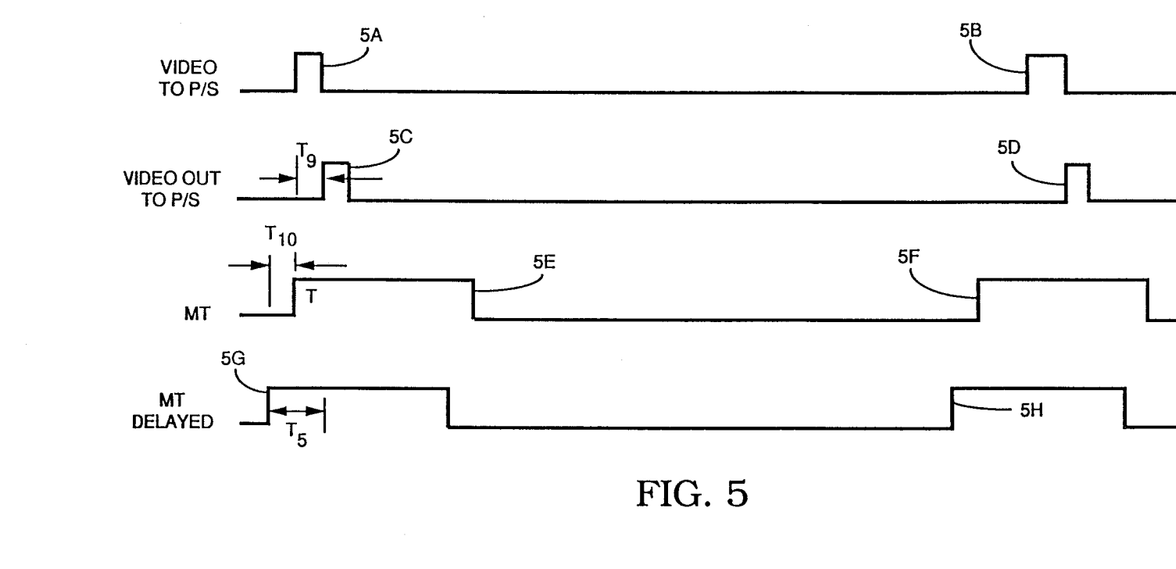
FIG. 5 is a timing diagram that shows waveforms at various locations within the reproduce portion of the system of FIG. 1.

Operation of the reproduction portion of the system of FIG. 1 can be understood by referring to the waveforms in FIG. 5. In FIG. 5, waveforms 5A and 5B represent one channel of video signals provided to P/S converter 59. Waveforms 5C and 5D represent video output signals from P/S converter 59. It should be noted that the leading edges of pulses 5C and 5D follow the leading edges of pulses 5A and 5B by a delay time, $T_9$. Waveforms 5E and 5F represent encoded master trigger pulses at the output of deskew circuit 55. Waveforms 5G and 5H represent delayed master trigger pulses at the output of pulse shaper 77. It should be noted that, as finally output, the master trigger pulses and the video signals (echo pulses) have the same time relation as those signals has when initially transmitted to the system of FIG. 1.

As a result of the previously described signal processing and management techniques, the system of the present invention, in practice, permits bandwidth per channel to be reduced to about 400 kilohertz/800 kilobits or less for recording radar signal information. This per-channel bandwidth is about eight times less than conventional and allows much longer recording periods for radar signal information.

Although the present invention has been described with particular reference to preferred embodiments, such disclosure should not be interpreted as limiting. Various alterations and modifications to the preferred embodiments will no doubt become apparent to those skilled in the art after having read the preceding disclosure. For example, although the preceding discussion has emphasized recording of radar signal information on fixed head recorders, it is feasible that other recorders may be used, such as rotary type. It is intended that the appended claims be interpreted as covering all alternative embodiments and equivalents as fall within the spirit and scope of the present invention.

What is claimed is:

1. A system to accurately record and playback radar signal information including master trigger pulses comprising:
    (a) first pulse stretcher means connected to detect occurrence of master trigger pulses and, upon each occurrence, to provide a stretched pulse having a leading edge coinciding in time with the leading edge of the detected master trigger pulse and having extended duration consistent with a selected recording channel bandwidth;
    (b) detection means to detect the presence of each of the stretched pulses and, upon detection, to provide a binary information signal representative of occurrence of the leading edge of the master trigger pulse;
    (c) echo pulse processing means to sample radar echo pulses and to quantize the sampled pulses to at least one bit level and then to convert a serial stream of the quantized echo pulses to parallel streams; and (d) recorder means connected to the echo pulse processing means to record the parallel streams of quantized echo pulses on magnetic recording media and connected to the detection means to record the binary information signals on the recording media on a channel of selected bandwidth.

2. A system as defined in claim 1 further including a synchronizing means that produces synchronizing pulses coincident with the leading edge of each master trigger pulse.

3. A system as defined in claim 2 wherein the echo pulse processing means includes shift registers that hold quantized echo pulse information, and the synchronizing means is connected such that the synchronizing pulses clear said registers.

4. A system as defined in claim 1 further including:
(a) azimuth data processing means to convert parallel streams of azimuth information to a serial stream to be recorded by the recorder means in synchronization with the binary information signals representing master trigger pulses.

5. A system as defined in claim 1 further including:
(a) second pulse stretcher means connected to detect occurrence of pre-trigger pulses and, upon each occurrence, to provide a stretched pulse having a leading edge coinciding in time with the leading edge of the detected pre-trigger pulse and having extended duration consistent with a selected recording channel bandwidth; and
(b) second detection means to detect the presence of each of the stretched pre-trigger pulses and, upon detection, to provide a binary information signal representative of occurrence of the leading edge of the pre-trigger pulse.

6. A system as defined in claim 1 wherein the recorder/reproducer employs a plurality of fixed recording/reproducing heads to record binary information on a plurality of channels.

7. A system as defined in claim 6 wherein the recorder/reproducer includes synchronization means to minimize time-displacement errors upon replay of recorded information.

8. A system to record and playback radar signal information comprising:
(a) recorder means for recording binary information on multiple channels;
(b) first pulse stretcher means to detect occurrence of master trigger pulses and, upon each occurrence, to provide a stretched pulse having a leading edge coinciding in time with the leading edge of the detected master trigger pulse and duration consistent with a selected recording channel bandwidth of the recorder;
(c) detection means to detect the presence of each of the stretched pulses and, upon detection, to provide a one-bit level binary information signal to the recorder;
(d) echo pulse processing means to sample and quantize radar echo pulses to at least one bit level and then to convert a serial stream of the quantized echo pulses to parallel streams for recording by the recorder; and
(e) azimuth data processing means to convert parallel streams of azimuth information to a serial stream to be recorded by the recorder in synchronization with the binary information signals representaing master trigger pulses.

9. A system as defined in claim 8 wherein the recorder/reproducer employs a plurality of fixed recording/reproducing heads to record binary information on a plurality of channels.

10. A system as defined in claim 8 wherein the recorder/reproducer includes synchronization means to minimize time-displacement errors upon replay of recorded information.

11. A system as defined in claim 8 further including a synchronizing means that produces synchronizing pulses coindicent with the leading edge of each master trigger pulse.

12. A system as defined in claim 11 wherein the echo pulse processing means includes shift registers that hold quantized echo pulse information, and the synchronizing means is connected such that the synchronizing pulses clear said registers.

13. A system as defined in claim 8 further including:
(a) second pulse stretcher means connected to detect occurrence of pre-trigger pulses and, upon each occurrence, to provide a stretched pulse having a leading edge coinciding in time with the leading edge of the detected pre-trigger pulse and having extended duration consistent with a selected recording channel bandwidth; and
(b) second detection means to detect the presence of each of the stretched pre-trigger pulses and, upon detection, to provide a binary information signal representative of occurrence of the leading edge of the pre-trigger pulse.

14. A process to record and reproduce radar signal information comprising the steps of:
(a) providing a stretched pulse having a leading edge generally coinciding in time with the leading edge of each master trigger pulse in the radar signal information and having a selectively extended duration;
(b) detecting the presence of each stretched pulse and, upon detection, providing binary information signals for recording;
(c) receiving and encoding radar echo signals to parallel streams of signals for recording;
(d) recording the parallel streams of echo signals on a first multiplicity of channels and recording the binary information signals on a channel of selected bandwidth.

15. A process as defined in claim 14 further including the step of producing synchronization pulses coincident with the leading edge of each master trigger pulse.

16. A process as defined in claim 14 further including the step of employing the synchronization pulses to clear shift registers that hold quantized echo pulse information.

17. A process as defined in claim 14 further including the steps of:
(a) processing azimuth data to convert parallel streams of azimuth information to a serial stream, and
(b) recording the serial streams of azimuth data in synchronization with the binary information signals.

* * * * *

UNITED STATES PATENT AND TRADEMARK OFFICE
CERTIFICATE OF CORRECTION

PATENT NO. : 4,839,657

DATED : June 13, 1989

INVENTOR(S) : Rene J. Chikhani, et al

It is certified that error appears in the above-identified patent and that said Letters Patent is hereby corrected as shown below:

Column 1, lines 1 to 3, the title of the invention "SYSTEM FOR RECORDING AND REPRODUCING RADAR SIGNAL INFORMATION" should read --METHOD AND SYSTEM FOR RECORDING AND REPRODUCING RADAR SIGNAL INFORMATION--.

Column 2, line 31, "fund" should read --found--.

Column 7, line 56, "&o" should read --to--.

Column 12, line 26, "has" should read --had--.

Signed and Sealed this

Third Day of April, 1990

*Attest:*

HARRY F. MANBECK, JR.

*Attesting Officer*   *Commissioner of Patents and Trademarks*